Dec. 30, 1969  C. E. KRAUS  3,486,391

TOROIDAL TYPE TRANSMISSION

Filed Sept. 19, 1968  2 Sheets-Sheet 1

Dec. 30, 1969   C. E. KRAUS   3,486,391
TOROIDAL TYPE TRANSMISSION
Filed Sept. 19, 1968   2 Sheets-Sheet 2
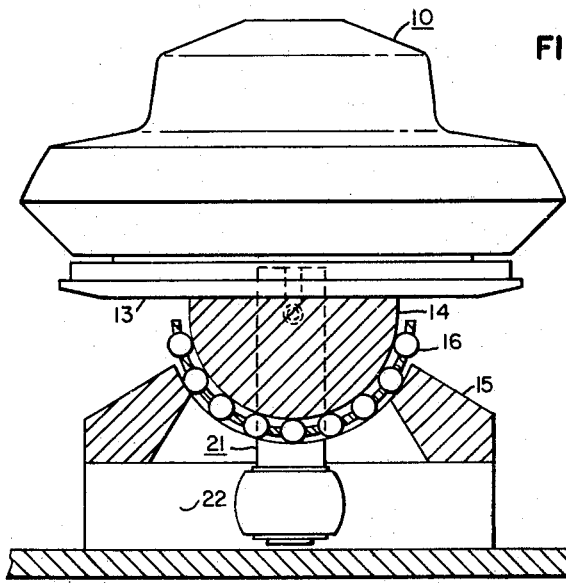
FIG.4
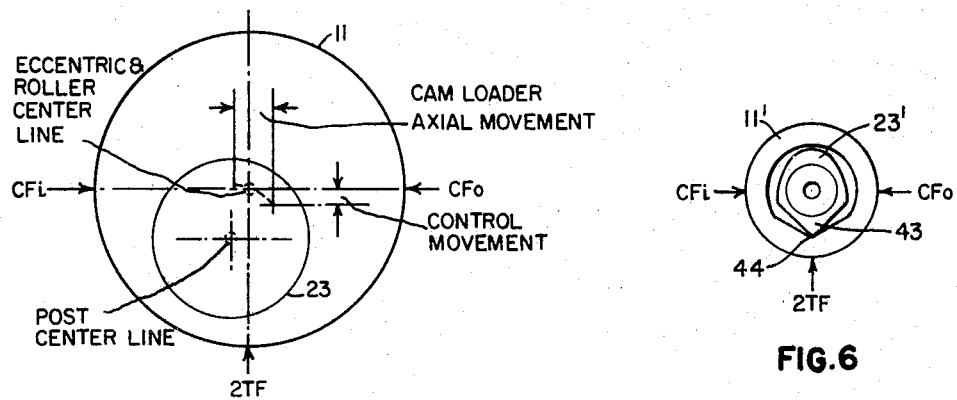
FIG.5
FIG.6

United States Patent Office 3,486,391
Patented Dec. 30, 1969

3,486,391
TOROIDAL TYPE TRANSMISSION
Charles E. Kraus, Allendale, N.J., assignor to Exceler-matic, Inc., a corporation of New York
Filed Sept. 19, 1968, Ser. No. 760,952
Int. Cl. F16h 15/08
U.S. Cl. 74—200                                3 Claims

ABSTRACT OF THE DISCLOSURE

A power transmission device of the toroidal type wherein there is caused a ratio changing precess movement which is a function of disc movement and, therefore, is a function of the driving load, since such movement is caused by and is proportional to the load. This movement can be arranged to offset speed droop due to load and, therefore, improve speed regulation or it can add to the speed droop for applications requiring automatic torque ratio response due to increasing load, as, for example, for vehicle transmission applications.

BACKGROUND OF THE INVENTION

Toroidal drives of the type disclosed herein have been provided with means for causing speed-ratio-changing precession or travel of each roller across the toric surfaces under changing load conditions.

In a toroidal drive, if the traction contacts on the rollers are inward on the roller from the center of the torus, axial thrust forces are developed on the rollers which are carried by the roller supporting structure. Since the discs defining the toroidal surfaces may have some axial movement under varying load conditions because of the action of commonly used loading cams, or possibly unequal housing or bearing deflections, it follows that the roller supports must have means for allowing the rollers to move axially without interference so that contact forces on opposite sides of the roller can equalize.

One such arrangement is disclosed in applicant's prior Patent 3,008,337 whereby there is shown means for causing precession by shifting each roller axially of the drive.

BRIEF DESCRIPTION OF THE DRAWINGS

FIGURE 4 is an end view taken along the line 4—4 of FIGURE 3;
FIGURE 5 is a diagram useful in understanding my invention,
and
FIGURE 6 is a diagram illustrating a second embodiment of my present invention.

DESCRIPTION

Figure 1:
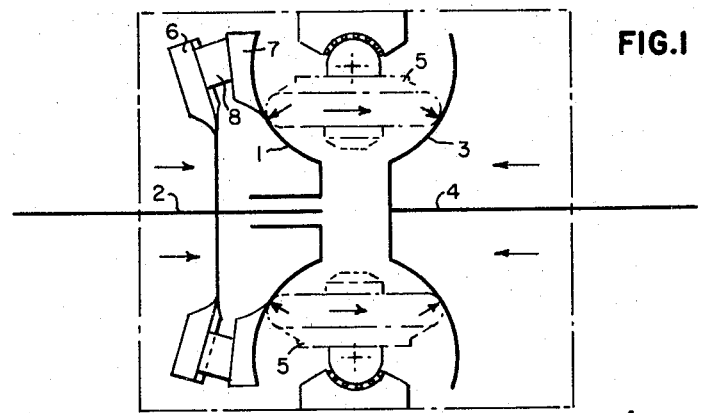
FIGURE 1 is a schematic disclosure of a typical toroidal drive.

Referring to FIGURE 1, there is shown a toroidal drive comprising input toroidal disc 1 operatively associated with driving or input shaft 2 and a facing output toroidal disc attached to driven or output shaft 4, thereby providing coaxial input and output members having facing toric surfaces. To provide transmission of the motion of shaft 2 to shaft 4, there is provided a plurality of circumferentially spaced rollers 5 disposed between the surfaces and in driving contact therewith for transmitting torque between the toric members. In order to provide some degree of axial movement of disc 1, there are provided loading cams 6 and 7 and cam rollers 8 which roll up or down the cam ramps to move disc 1 axially. Suitable sprag and cam devices are shown in applicant's prior United States Patents 3,008,337 and 3,087,348.

Figure 3:
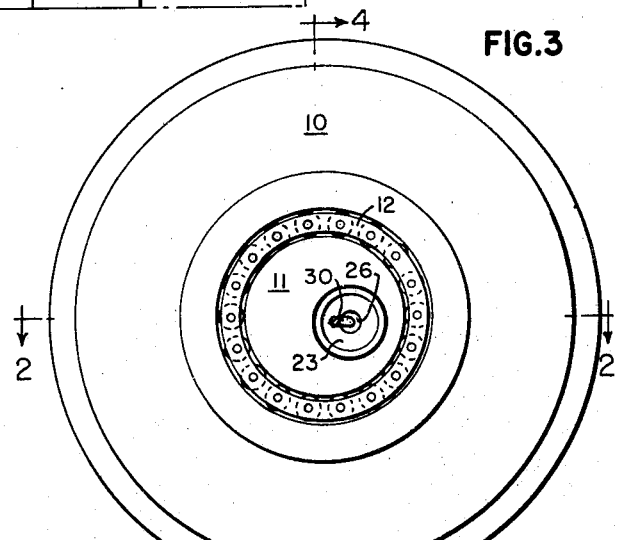
FIGURE 3 is a top view taken along the line 3—3 of FIGURE 2.
Figure 2:
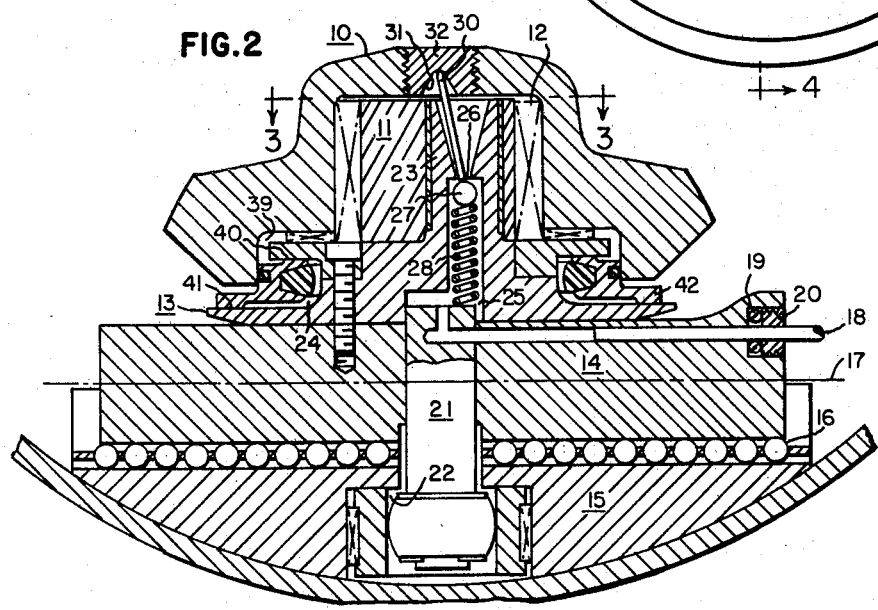
FIGURE 2 is a side elevation of a drive embodying the principles of my invention, sectioned along the line 2—2 of FIGURE 3.

Referring to FIGURES 2, 3 and 4 there is shown a roller 10 suitable for use in toroidal drives. Each roller is journaled for rotation on a spindle 11 by bearings 12. The spindle is an eccentric having an off-center opening for receiving a post 23 carried by an end plate 13 which in turn is carried by a pivotally supported shaft 14 journaled on a substantially semi-cylindrical bearing 16 carried by base member 15. Thus shaft 14 provides support for the roller assembly and the spindle axis extends at right angles inwardly toward the transmission axis, the thrust bearing end of the spindle being disposed adjacent to the pivot shaft. Thus each pivot shaft 14 is free for limited rotation about its center line 17 and supported for limited axial or translational movement for initiating speed ratio changing pivotal movement. Bearing means is provided for supporting each roller on its spindle. Roller 10 is preferably, as shown, floatingly carried from plate 13 by a hydrostatic thrust bearing fully described and claimed in applicant's copending U.S. application Ser. No. 707,911, filed Feb. 5, 1968. The hydrostatic bearing receives fluid lubricant through the horizontal pivot shaft 14 by means of a tube 18 inserted in a longitudinally extending passage and is held by O ring 19 and nut 20. Tube 18 is stationary and the pivot shaft, of course, turns as the ratio changes. The non-rotating hydrostatic bearing assembly including plate 13 is attached to the pivot shaft and located centrally by control pin 21 which passes through shaft 14 into recess 22 in base member 15. There is provided on the upper surface of the bearing assembly a post 23 which is off center, thereby providing eccentric pivot post 11.

Means is provided for furnishing high pressure lubricant into bearing cavity 24 as disclosed in the above-identified application. For this purpose, a centrally located passage 25 is provided in post 23 which is partially closed at its upper end to form opening 26. A ball valve 27, biased toward the closed position by spring 28 controls lubricant flow. A pin 30, seated at its upper end in recess 31 in plug 32 and engaging ball 27 at its lower end holds ball 27 off its seat when there is no pump pressure. The pin 30 is on an angle because of the eccentricity. The end engaging the ball valve must be on center line. When the drive is running and fluid pressure is present, oil flows through the ball valve, through the radial roller bearing, across the unloaded roller thrust washer and to the seal ring and is ejected after passing the seal lands of the hydrostatic bearing.

As described in the copending application, the sides of the seal ring cavity 39 are flat and the annular gap lands 40, 41 are machined into the seal ring 42. The sides overlap the lands by half the amount of the float distance required and, of course, the inner cavity flange must also clear the inner roller periphery by a like distance, and the ring must not bottom.

In FIGURE 5, there is diagrammed the eccentric 11 and pivot post 23, the center line of post 23 being offset from that of the eccentric as shown. There is represented not only the axial movement effected by the cam loader mechanism, but also that effected by the eccentric.

The tangential force on the roller is the sum of the tangential force values for both contacts of the roller and the toroidal discs and is labeled 2TF in FIGURE 5 and shown applied to the roller center line. The contact force CFi on the input side is balanced by contact force CFo on the output side except for a component due to the offset of the post position. Since this component is only a fraction of the tangential force which, in turn, is only a fraction of the contact forces, the component has little effect on the heavy contact forces.

The ability of rollers 10 to move axially of the drive substantially reduces any shimmy or vibration of the pivot shaft 14 resulting from load fluctuations and is approximately zero at the one-to-one ratio.

In operation, any load change works through the loading cam to produce movement of the assocaited disc and rollers 10. With increasing load the tangential forces also increase and the endwise force on the pivot shaft 14 increases in a direction to tend to shift the shaft. This results in a precess motion in a direction to cause a droop in output speed and, therefore, affects speed regulation.

Note that the roller 10 can float on the thrust bearing and will move with the disc axial movements by the eccentric rotating on the support post 23. This post is part of, or permanently attached to, the stationary thrust bearing support which in turn is rigidly attached to the rotatably mounted support shaft. The rotation of the eccentric, in addition to moving the roller axially of the drive also moves it along the support shaft which is of course a control movement and causes a ratio precess. The relation between these two directions of motion and, therefore, the amount of ratio precess for a given sidewise movement can be controlled by offsetting the post and the direction of ratio precess depends on which side the post is offset and which direction the drive is rotating. We can then correct for output speed loss due to load and make the output speed almost independent of load which is an advantage for constant speed drive use. We can, with an opposite offset, increase the output speed loss with load and actually increase the reduction ratio with load if torque response is an advantage with transmissions.

The eccentric can be positioned to cause a motion component offsetting any shift of the pivot shaft and it can be arranged to exceed it and cause the output shaft to speed up with increasing load. Also, if the eccentric is located to swing to the other side, the motion could increase the shaft shift and increase the speed characteristic and make the drive load responsive.

While there is shown a hydrostatic bearing, other bearings may be used, such as, for example, a flat roller thrust bearing.

In FIG. 6 there is illustrated an alternative embodiment wherein the pivot post 23' within the opening in eccentric 11' is not circular in cross-section within a circular opening but is substantially reduced in cross-section and provided with a projecting portion or edge 43 for engagement with a receiving portion of the interior wall of the eccentric such as an angle 44. In effect, eccentric 11' comprises a ring within which post 23' has only sufficient contact to effect operation. With this arrangement, precessing is accomplished through positive engagement with no, or substantially no, relative slip.

I claim:
1. In a variable speed-ratio transmission comprising:
  (a) co-axial input and output members having facing toric surfaces;
  (b) a plurality of circumferentially-spaced rollers disposed between said surfaces and in driving contact with said surfaces for transmitting torque from the input member to the output member;
  (c) a spindle for each roller on which the roller is journaled for rotation about the spindle axis;
  (d) bearing means supporting each roller on its spindle; and
  (e) support means for each roller and spindle including a pivot shaft and from which the spindle extends at right angles inwardly toward the transmission axis with said spindle having a thrust bearing end disposed adjacent to the pivot shaft, said pivot shafts being supported for pivotal movement for speed-ratio changing movement of their rollers across said toric surfaces and being supported for translational movement along their respective axes for initiating said speed-ratio changing pivotal movement of said rollers;
the improvement wherein said spindle comprises an end plate having an upwardly extending post eccentrically disposed, and an eccentric having an eccentrically disposed opening for receiving said post, said post and said eccentric being free to move with respect to each other.

2. The transmission of claim 1 having means providing an annular bearing space for receiving fluid under pressure to provide a hydrostatic bearing between the roller and its spindle.

3. The transmission of claim 1 wherein said opening is provided with a receiving portion and said post is provided with a projecting portion engaging said receiving portion.

References Cited
UNITED STATES PATENTS 2,959,972 11/1960 Madson _____ 74—200
2,959,973 11/1960 Madson _____ 74—200

JAMES A. WONG, Primary Examiner